L. I. COONRADT.
SPRINKLER.
APPLICATION FILED JULY 1, 1910.
979,382.
Patented Dec. 20, 1910.
2 SHEETS—SHEET 1.
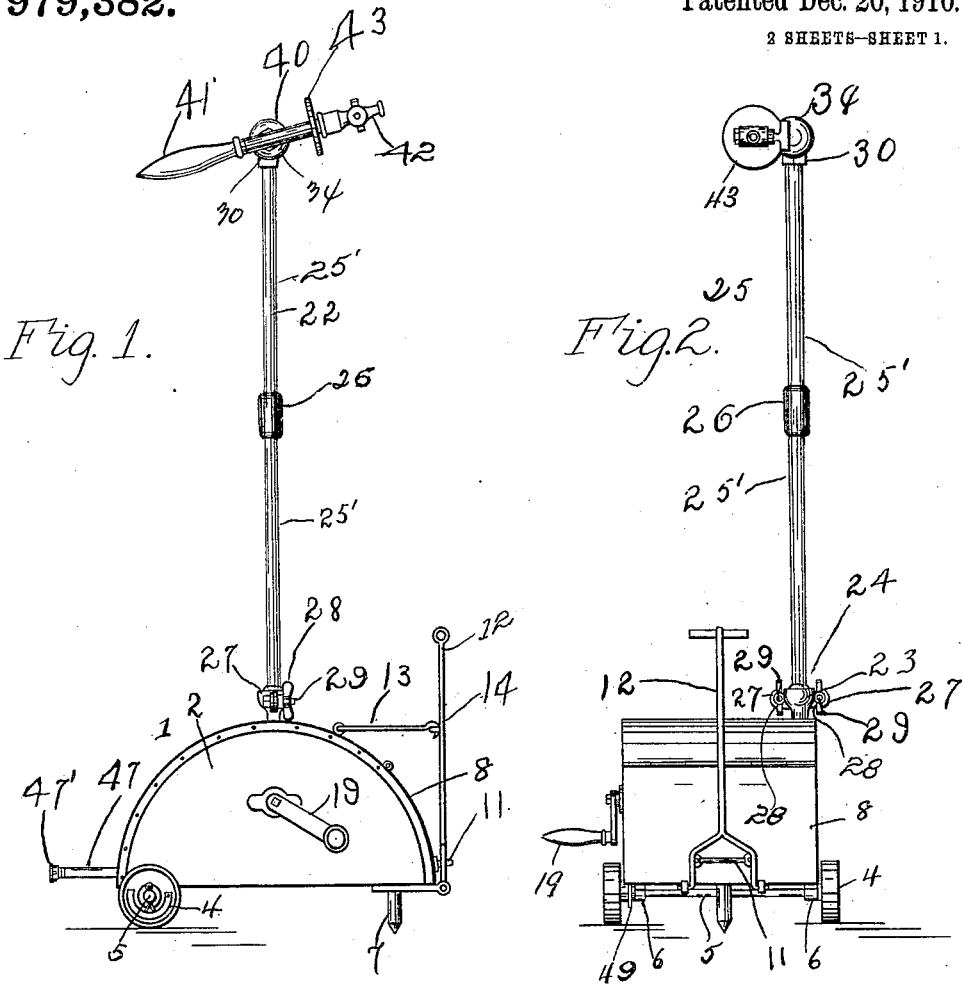
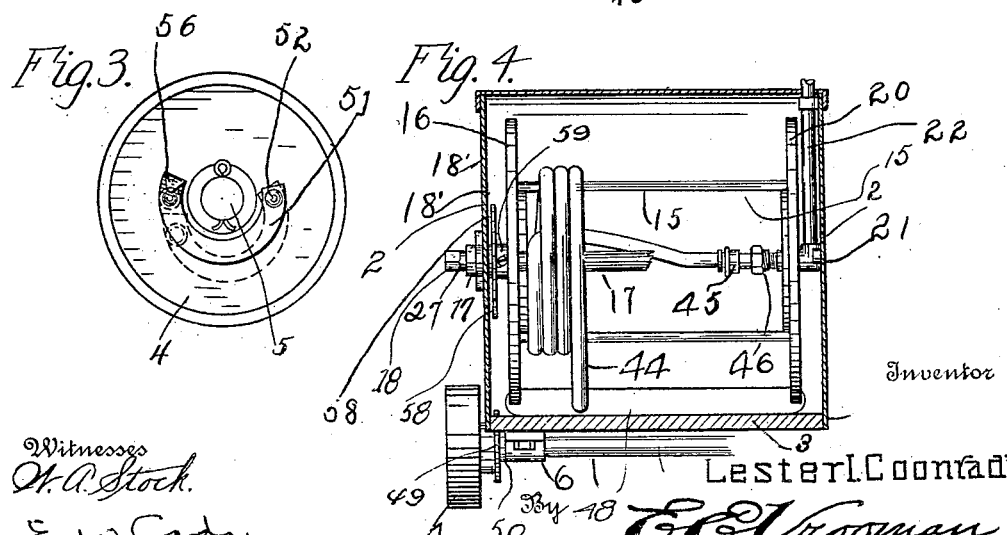
Witnesses
H. A. Stock.
E. W. Cady.
Inventor
Lester I. Coonradt
By E. E. Vrooman,
Attorney

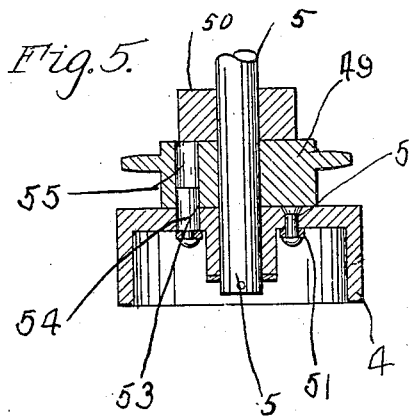
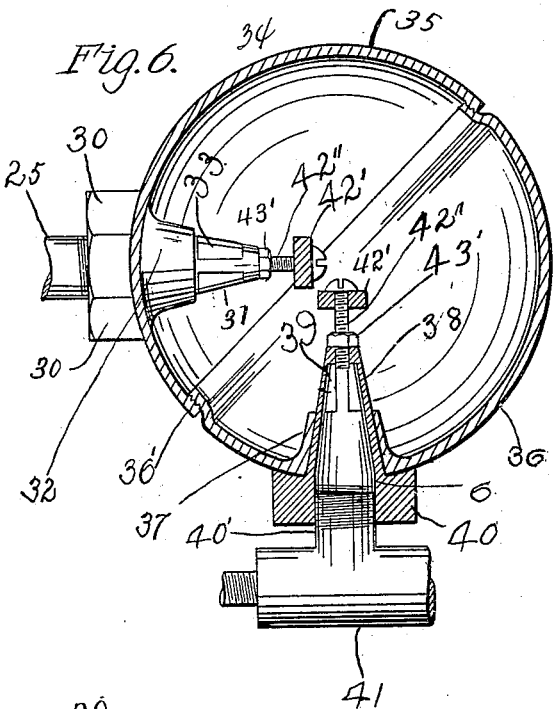
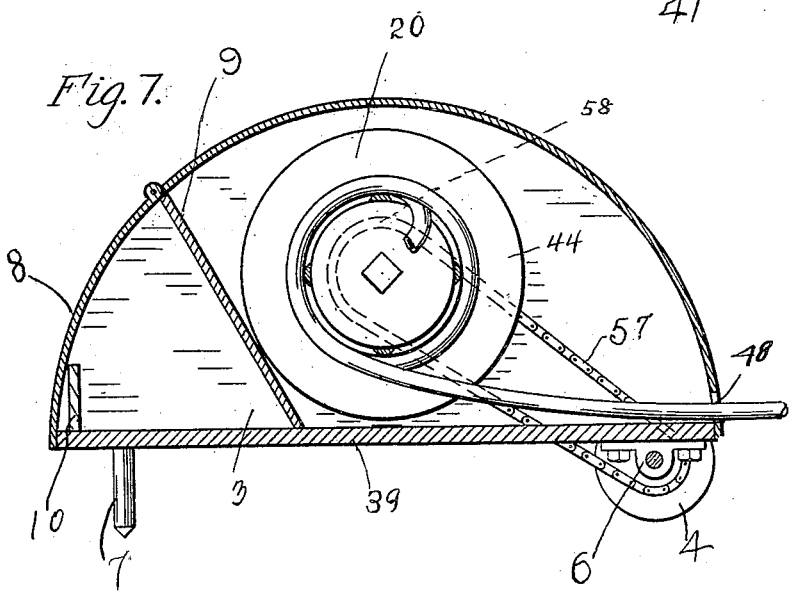

UNITED STATES PATENT OFFICE.

LESTER I. COONRADT, OF OAKLAND, CALIFORNIA.

SPRINKLER.

979,382.   Specification of Letters Patent.   Patented Dec. 20, 1910.

Application filed July 1, 1910.   Serial No. 569,965.

*To all whom it may concern:*

Be it known that I, LESTER I. COONRADT, a citizen of the United States, residing at Oakland, in the county of Alameda and State of California, have invented certain new and useful Improvements in Sprinklers, of which the following is a specification.

This invention has special reference to devices for watering lawns and grass plots and has special reference to devices of this kind in which a water discharge spout connected with a hose is mounted on a stand which can be located at different points on the lawn or grass plot.

The invention has for its object to provide an improved apparatus of this kind which can be connected with a water supply and moved from one point to another and left in such places to water the grass.

The invention further has for its object to provide an improved apparatus of this kind by means of which the water discharge nozzle may be adjusted to different positions.

The invention further has for its object to provide an improved apparatus of this kind by means of which as it is moved into and out of position for use, a length of hose employed therewith will be automatically unwound or wound up.

The invention consists of an improved apparatus for watering lawns or grass plots and in details of construction thereof as hereinafter set forth and claimed.

In accomplishing the objects of this invention as generally stated above it will of course be understood that the essential features thereof are subject to changes and modifications in design and structural arrangements but one preferred and practical arrangement is disclosed in the following specification and attached drawings wherein:—

Figure 1 is a side view in elevation of an apparatus for watering lawns and grass plots constructed in accordance with this invention. Fig. 2 is an end view thereof. Fig. 3 is an enlarged detail view of one of the supporting wheels of the apparatus showing the means for connecting it with a gear operated by the hose reel. Fig. 4 is an end view of the apparatus with parts broken away and showing the casing thereof in transverse section. Fig. 5 is an enlarged detail view in longitudinal section of one of the supporting wheels and a portion of the gear connecting it with the reel. Fig. 6 is an enlarged detail view in cross section of the universal joint supporting the hose nozzle. Fig. 7 is an enlarged detail view of the casing in longitudinal section showing one of the supporting wheels and the gearing connecting it with the reel.

In the construction of this invention a suitable casing 1 is provided, and as here shown, preferably consisting of a metallic casing 2 having a wooden bottom 3, and mounted at one end on wheels 4, each wheel 4 being mounted on the end of a shaft 5 supported in bracket bearings 6, secured to the underside of the bottom 3. The forward end of the casing is supported by any suitable support, and as here shown, preferably by means of a pointed pin 7, which serves to not only support the forward end of the casing but also by engaging the ground to hold it from moving when located on a slope or inclined piece of ground.

The casing 1 is provided with a hinged cover 8 which incloses a chamber at one end of the casing which chamber is formed by means of a transverse partition 9 extending across the interior of the casing and by a short transverse partition 10 mounted on the bottom of the casing, and extending from side to side thereof, said chamber formed by said partitions serving as a receptacle for storing wrenches, nozzles and other paraphernalia employed with this apparatus.

The device is provided with a handle 12 for drawing the same, said handle 12 when not in use being held out of the way by a hook 13 hinged to the top of the casing and engaging an eye 14 on the handle 12.

15 is a hose reel having one of its disks 16 mounted on a stub shaft 17, projecting through one of the sides of the casing, and formed at one end with a square end portion 18 adapted to be engaged by means of a handle 19 for manually turning the reel. The other disk 20 of the reel is mounted on a tubular elbow 21 projecting from one side of the casing and having connected to one of its arms a pipe 22, at the side of the casing and projecting through the top thereof and terminating in a cup-shaped end 23 forming a socket for a ball shaped end 24 of a vertical pipe 25 preferably formed in sections 25' detachably connected together by a threaded sleeve 26. The ball shaped end 24 is held in position in the cup shaped end 23 by means of pairs of ears 27 projecting from the sides of the cup-shaped end 23, said cup-shaped end being split so as to be movable to clamp the ball-shaped end 24. The sections of the cup-shaped end 23 are clamped to the ball-shaped end 24 by means of wing nuts 28, each on a bolt 29 extending through the ears 27. The upper end of the pipe 25 is screwed into a head 30 of a tapering plug 31, which is seated in a tapering tubular socket 32, and is formed with lateral openings 33 for the passage of water, said socket 32 being formed with and projecting into a casing 34 formed in two sections 35 and 36 which are detachably connected together preferably by a screw threaded engagement 36'. The tubular projection 32 extends into a hemispherical section 35 of the casing 34, and a similar tubular projection 37 is formed with the hemispherical section 36 of the casing 34, and has seated therein a tapering projection 38 similar to the projection 31 and formed with lateral openings 39 for the passage of water, said tapering projection 38 having an enlarged head 40 similar to the head 30 of the tapering projection 31. Held in threaded engagement with the head 40 of the tapering projection 38 is the threaded arm 40' of a T shaped tubular arm 41 provided at one end with a handle 41' and at its other end with a hose nozzle 42. In the rear of the hose nozzle 42 mounted on the arm 41 is a disk 43 which protects the person manipulating the handle 41' from water scattered from the nozzle 42. Each of the tapering projections 38 and 31 has its head 40 and 30 respectively formed with angular sides so as to enable a wrench to be applied thereto to screw the same into engagement with the pipe 25 and the head 40 with the T shaped arm 41. Connected with the end of each of the tapering projections 31 and 38 is a screw 42'' which engages a transverse bar 42' in each of the sections of the casing 34, the ends of said bars being secured to the sides of the sections of the casing. On each of said screws 42 is mounted a jam nut 43' which bears against the end of one of the tapering projections 38 and 31, and which serves to bind the screw and tapering projection together thereby permitting each of the tapering projections 38 and 31 to turn in the tubular sockets 37 and 32.

Wound on the reel 15 is a hose 44, which is connected at one end with a universal swivel hose connection 45 connected with a packing box 46 secured to the end of the tubular elbow 21. The other end of the hose 44 projects through an opening 48 in the rear end of the casing and is adapted to move through the same as the hose is wound upon or unwound from the reel. The end 47 of the hose 44 may be connected by a coupling 47' with a faucet or other water supply. Mounted on the stub shaft 5, adjacent to one of the wheels 4 is a sprocket wheel 49 held in place by a collar 50, and adapted to be locked with the wheel 4 by means of a curved flat strip 51 secured to the wheel 4 by a rivet 52, and hinged thereto so as to swing thereon. The other end of said flat strip 51 is provided with a pin 53 which projects through a hole 54 in the wheel 4 and into the hole 55 in the sprocket wheel 49. By this means the wheel 4 is locked to the sprocket wheel 49 to turn therewith. The wheel 4 is thrown out of engagement with the sprocket wheel 49 by pulling back the pin 53 by means of a projection or catch 56 on the end of the curved strip 51 and the pin 53 is held out of engagement with the hole 54 by swinging the strip 51 out of the way to the position shown in dotted lines in Fig. 3, the pin 53 resting against the wall of the wheel 4.

In order that the hose may be unwound from the reel after the hose has been connected to a faucet, the sprocket wheel 49 is connected by an endless chain 57 with a sprocket wheel 58 mounted on the stub shaft 17, and held in place by a collar 59 on the shaft 17 between the disk 16 and the sprocket wheel 58.

It will be understood that in lieu of the specific structure described in connection with the wheel 4 and the shaft 5 any suitable clutch mechanism may be employed.

It will be seen that by means of this invention after the hose has been attached to the faucet and the wheel 4 clutched to the shaft 5 the apparatus may be drawn to any point desired, the gear between the hose reel and the shaft 5 causing the hose to be unwound from the reel. The swivel connection of the hose with the packing box permits of the unwinding of the hose from the reel. The sprocket wheels on the shafts 17 and 5 are of such different sizes in relation to each other that the hose is unreeled at the same speed that the apparatus is moved forward—thus preventing any kinking of the hose as it is wound from the reel. When moving back to the faucet the hose will be automatically wound upon the reel, thereby saving the labor of winding the hose upon the reel. The handle 19 is used when the gear mechanism is disconnected. Of course it will be understood that in moving the apparatus from place to place when it is desired not to pay out the reel the clutch engaging wheel 4 with a shaft 5 is disconnected.

It will be seen that by means of the joints at each end of the pipe 25, the pipe 25 may be adjusted at any angle, and that the nozzle 42 may be adjusted to any angle by turning the arm 41 in the casing 34.

It is contemplated employing any form of universal joint in the construction of the joints at each end of the pipe 25.

When it is desired to dismantle the apparatus the several parts may be readily detached, the sections of the pipe 25 and of the nozzle, being detached and placed in the chamber within the casing.

Having described the invention, I claim:—

1. In an apparatus of the character described, a transportable body, a water pipe projecting upward from the top of said body and connecting at its lower end by a universal joint thereto, and a water discharge nozzle connected to the top of said pipe by a universal joint and communicating therewith.

2. In an apparatus of the character described, a transportable casing, a pipe having its lower end mounted in said casing and projecting upward therefrom, a hose reel mounted in said casing, and a water discharge nozzle adjustably swiveled to the upper end of said pipe and communicating therewith.

3. In an apparatus of the character described, a transportable casing, a water pipe having its lower end mounted in said casing and projecting upward therefrom, a hose reel mounted in said casing, a hose wound on said reel and connected at one end by a swivel joint with the lower end of said water pipe, and a water discharge nozzle adjustably swiveled to the upper end of said pipe, and communicating therewith.

4. In an apparatus of the character described, a transportable casing, a water pipe mounted in said casing and projecting through the top of the same, an elbow pipe mounted on the lower end of said pipe, a hose reel mounted in said casing, a hose wound upon said reel and having one end connected with said elbow pipe joint by means of a swivel joint, a vertical water pipe having its lower end connected with the upper end of said pipe in the casing by means of a universal joint, means for adjustably tightening said joint, a water discharge nozzle connected at the upper end of said pipe by a universal joint, and means for adjusting said discharge nozzle.

5. In an apparatus of the character described, a casing mounted on wheels at one end and having a support at its other end adapted to penetrate the ground, a water pipe projecting upward from said casing and having its lower end mounted thereon, a hose reel mounted in said casing, a hose wound upon said reel and having one end connected with the lower end of said water pipe and the other end projecting out of said casing, a water discharge nozzle connected to the upper end of said pipe by a universal joint and communicating therewith, and means for adjusting said nozzle at different angles.

6. In an apparatus of the character described, a casing mounted on wheels, a water pipe having its lower end mounted on said casing and projecting upward therefrom, a hose reel mounted in said casing, a hose wound upon said reel and having one end connected with the lower end of said water pipe, a gear mechanism connecting said reel with the shaft of the wheels, a water discharge nozzle connected with the upper end of said pipe by a universal joint and communicating therewith, and means for adjusting said nozzle at different angles.

7. In an apparatus of the character described, a casing mounted on a pair of wheels, a water pipe having its lower end mounted on said casing and projecting upward therefrom, a hose reel mounted in said casing and having one end connected with the lower end of said water pipe by means of a swivel joint, a large sprocket wheel on the shaft of said reel, a smaller sprocket wheel on the shaft of the wheels, an endless sprocket chain connected with said sprocket wheels, means for engaging one of the wheels with, and disengaging it from one of said sprocket wheels, a water discharge nozzle connected with the upper end of said pipe by a universal joint and communicating therewith, and means for adjusting said nozzle at different angles.

8. In an apparatus of the character described, a casing having a hinged cover, and a chamber for the reception of tools and the parts of the apparatus, said casing being mounted upon wheels, a water pipe mounted in said casing and projecting through the top of the same, an elbow pipe joint on the lower end of said water pipe, a hose reel mounted in said casing, a hose wound upon said hose reel having one end detachably connected by a swivel joint to said elbow pipe, a gear mechanism engaging the shaft of the reel with the shaft of the wheels, a vertical water pipe formed in sections and having its lower end detachably connected by a universal joint to the upper end of said water pipe in the casing, means for tightening said universal joint, a water discharge nozzle detachably connected by a universal joint to the upper end of said sectional water pipe, and means for tightening said universal joint.

9. In an apparatus of the character described, a casing mounted on wheels, a hose reel mounted in said casing, a gear mechanism connecting the shaft of the hose reel with the shaft of the wheels, a hinged arm mounted on one of said wheels and provided with a pin for locking the wheel to the gear mechanism, a water pipe having its lower end mounted in said casing, a hose wound upon said reel and connected with the lower end of said water pipe, said water pipe projecting upward from the top of said casing, a water discharge nozzle connected by a universal joint at the top of said water pipe and communicating therewith and means for tightening said universal joint.

In testimony whereof I affix my signature in presence of two witnesses.

LESTER I. COONRADT.

Witnesses:
H. C. Schroeder,
F. I. Schroeder.